United States Patent
Worrall et al.

(10) Patent No.: US 10,582,516 B2
(45) Date of Patent: Mar. 3, 2020

(54) UPLINK RESOURCE ALLOCATION FOR DIRECT COMMUNICATIONS BETWEEN USER EQUIPMENT WITHIN GROUPS

(71) Applicant: Alcatel Lucent, Boulogne Billancourt (FR)

(72) Inventors: Chandrika Worrall, Swindon (GB); Seau Sian Lim, Swindon (GB)

(73) Assignee: Nokia Technologies Oy, Espoo (FI)

( * ) Notice: Subject to any disclaimer, the term of this patent is extended or adjusted under 35 U.S.C. 154(b) by 51 days.

(21) Appl. No.: 15/513,664

(22) PCT Filed: Sep. 11, 2015

(86) PCT No.: PCT/EP2015/070834
§ 371 (c)(1),
(2) Date: Mar. 23, 2017

(87) PCT Pub. No.: WO2016/045993
PCT Pub. Date: Mar. 31, 2016

(65) Prior Publication Data
US 2017/0245294 A1    Aug. 24, 2017

(30) Foreign Application Priority Data

Sep. 26, 2014  (EP) ..................................... 14306488

(51) Int. Cl.
*H04B 7/00* (2006.01)
*H04W 72/10* (2009.01)
*H04W 72/12* (2009.01)

(52) U.S. Cl.
CPC ....... *H04W 72/10* (2013.01); *H04W 72/1284* (2013.01)

(58) Field of Classification Search
CPC . H04W 76/007; H04W 76/023; H04W 84/02; H04W 88/10

(Continued)

(56) References Cited

U.S. PATENT DOCUMENTS

| 8,918,111 | B2 * | 12/2014 | Shin | ......................... | H04W 4/70 |
| | | | | | 455/450 |
| 9,544,099 | B2 * | 1/2017 | Etemad | ................. | H04W 28/08 |

(Continued)

FOREIGN PATENT DOCUMENTS

| CN | 101827391 | 9/2010 |
| WO | 2013/183727 | 12/2013 |
| WO | 2016/047261 | 3/2016 |

OTHER PUBLICATIONS

"3$^{rd}$ Generation Partnership Project; Technical Specification Group Services and System Aspects; Study on architecture enhancements to support Proximity-based Services (ProSe) (Release 12)," 3GPP TR 23.703 V12.0.0, pp. 1-13, 6.2.1.1.2 (pp. 131-132), 6.2.6 (pp. 154-157), 8.2 (p. 256), (Feb. 2014).

(Continued)

*Primary Examiner* — Dmitry Levitan
(74) *Attorney, Agent, or Firm* — Fay Sharpe LLP

(57) ABSTRACT

A method performed at a user equipment of requesting resource from a network node within a wireless network for transmitting uplink data, the uplink data being data that is to be transmitted as a direct communication directly between the user equipment and user equipment within at least one of a plurality of groups of user equipment of which the user equipment is a member. The method comprises: generating a status report the status report providing an indication of an amount of the uplink data and an indication of least one group to which the uplink data is to be transmitted; transmitting an indication of a priority of the at least one group towards the network node; and transmitting the status report towards the network node.

13 Claims, 2 Drawing Sheets

(58) Field of Classification Search
USPC ........ 370/310, 315, 328, 341, 349, 432, 465
See application file for complete search history.

(56) References Cited

U.S. PATENT DOCUMENTS

| | | | | |
|---|---|---|---|---|
| 9,609,680 | B2* | 3/2017 | Baghel | H04W 76/14 |
| 9,814,045 | B2* | 11/2017 | Kwon | H04W 76/14 |
| 2013/0150061 | A1 | 6/2013 | Shin et al. | |
| 2016/0044737 | A1* | 2/2016 | Kwon | H04W 76/028 |
| | | | | 370/328 |
| 2017/0041942 | A1* | 2/2017 | Wallentin | H04W 72/1242 |
| 2017/0280486 | A1* | 9/2017 | Lee | H04W 76/40 |
| 2018/0139668 | A1* | 5/2018 | Takahashi | H04W 74/08 |

OTHER PUBLICATIONS

International Search Report for PCT/EP2015/070834 dated Nov. 12, 2015.

Alcatel-Lucent, Alcatel-Lucent Shanghai Bell, BSR for D2D[online], 3GPP TSG-RAN WG2#86 R2-142587, Internet <URL:http://www.3gpp.org/ftp/tsg_ranWG2_RL2/TSGR2_86/Docs/R2-142587.zip>, May 23, 2014.

ZTE Corporation, Contents of D2D BSR[online], 3GPP TSG-RAN WG2#87 R2-143603, Internet <URL:http://www.3gpp.org/ftp/tsg_ran/WG2_RL2/TSGR2_87/Docs/R2-143603.zip>, Aug. 22, 2014, pp. 1-2.

Intel Corporation, BSR reporting for D2D communication [online], 3GPP TSG-RAN WG2#85bis R2-141222, Internet <URL:http://www.3gpp.org/ftp/tsg_ran/WG2_RL2/TSGR2_85bis/Docs/R2-141222.zip>, Apr. 4, 2014.

Huawei, HiSilicon, Discussion on ProSe-BSR Format[online], 3GPP TSG-RAN WG2#87 R2-143810, Internet <URL: http://www.3gpp.org/ftp/tsg_ran/WG2_RL2/TSGR2_87/Docs/R2-143810.zip>, Aug. 22, 2014.

Rapporteur (Ericsson), [85bis#19][LTE/D2D] Resource allocation details for D2D Communication[online], 3GPP TSG-RAN WG2#86 R2-142429, Internet <URL:http://www.3gpp.org/ftp/tsg_ran/WG2_RL2/TSGR2_86/Docs/R2-142429.zip>, May 23, 2014.

* cited by examiner

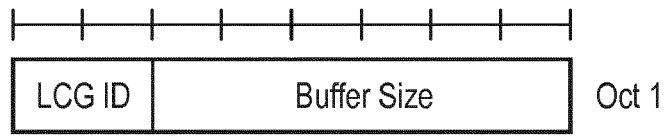
FIG. 1a -Prior Art
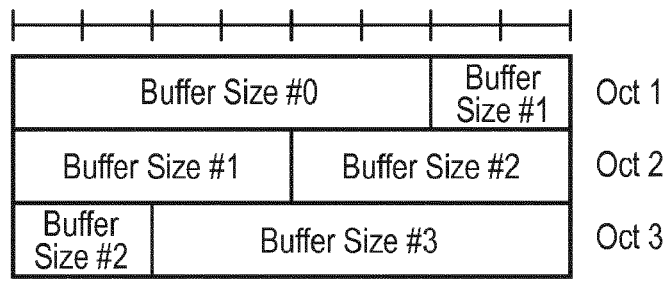
FIG. 1b -Prior Art
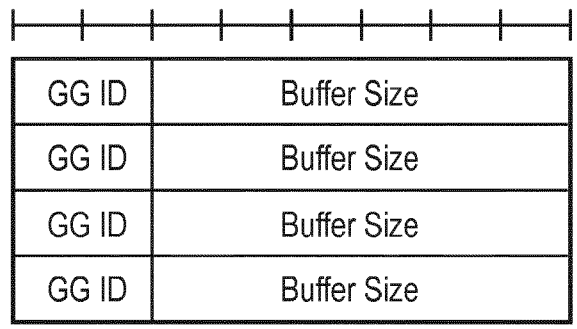
FIG. 2
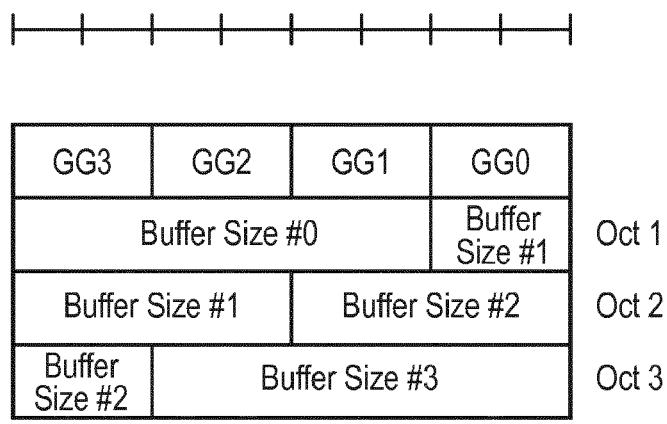
FIG. 3

UPLINK RESOURCE ALLOCATION FOR DIRECT COMMUNICATIONS BETWEEN USER EQUIPMENT WITHIN GROUPS

FIELD OF THE INVENTION

The present invention relates to a method, computer program, user equipment and network node for facilitating direct communication between groups of user equipment.

BACKGROUND

Wireless telecommunication systems are known. In such systems network connectable devices or mobile communication devices such as user equipment, mobile telephones and similar are typically operable to communicate with base stations provided by network providers.

In known wireless telecommunication systems, radio coverage is provided to network connectable devices within areas known as cells. A base station is located in each cell to provide radio coverage. Typically, network connectable devices in each cell are operable to receive information and data from a base station and to transmit information and data to a base station. This information or data can then be transmitted to further network nodes within the wireless communication network, allowing network connectable devices in different cells to communicate with each other as they roam through the wireless communication system. A number of base stations are provided and are distributed geographically in order to provide a wide area of coverage to network connectable devices.

In some situations it may be desirable for user equipment (UE) that are located in proximity to each other to transmit information directly to each other rather than via the network nodes of a wireless communication network. For such direct device-to-device communication the channel used for this communication (comprising time-frequency resource over which a signal is to be transmitted) should, where possible, be allocated to a device transmitting the signal in a way that avoids or at least reduces signal collision.

There are two ways of doing this, one is under the control of the wireless communication system where a network node will allocate the resource and the other under control of the user equipment where it will select a resource from a pool of resources reserved for such communications. The former clearly has advantages of reduced collisions as it is under central control but it will only be applicable where the user equipment is within coverage of a network cell.

ProSe communication is currently being standardized in 3GPP. The public safety requirements require a public safety support UE to be able to communicate directly with multiple public safety user groups at the same time. For example, a public safety UE may be a member of a police group, an ambulance service group and a fire group and would be communicating to any or all groups at the same time. Moreover, it is likely that the priority of the groups (among the member groups) changes dynamically depending on the incident. For example in the case of a road accident if there are injured personals, then calling the ambulance would take the highest priority. If there is a fire involved, calling the fire brigade takes the first priority. Therefore, where the network node is controlling the allocation of resources for these direct communications it would be desirable for the network node to be aware of the priority of the groups as they dynamically change such that when allocating resources for the communications the current priorities are known.

US 2013/0150061 discloses a device to device group communication method. In this method a device that communicates with two or more devices that belong to the same D2D group transmits a scheduling request to a base station and also transmits a buffer status report. The UE receives resource allocation from the base station and then transmits the D2D user data along with a D2D group identifier as a device ID and the D2D resource allocation information necessary for the D2D group communication as a D2D communication.

3GPP: Technical Specification Group Services and System Aspects; TR23.703v.12.0.0 "Study on architecture enhancements to support proximity-based services (PRoSe)" discloses at a high level potential ways that group D2D communications and in particular, ProSe communications could be supported.

SUMMARY

A first aspect of the present invention provides a method performed at a user equipment of requesting resource from a network node within a wireless network for transmitting uplink data, said uplink data being data that is to be transmitted as a direct communication directly between said user equipment and user equipment within at least one of a plurality of groups of user equipment of which said user equipment is a member, said method comprising: generating a status report said status report providing an indication of an amount of said uplink data and an indication of at least one group to which said uplink data is to be transmitted; transmitting an indication of a priority of said at least one group towards said network node; and transmitting said status report towards said network node.

The present invention recognises that where a user equipment is a member of several groups and is transmitting data to at least one of these groups then, in particular, where the communication may be a high priority communication it is important that the communication is prioritised in a suitable manner. Furthermore, the priority of the different groups may dynamically change depending on the situation and, thus, it is advantageous if pending communications are prioritised according to the current situation.

The present invention addresses this by recognising that the user equipment with pending uplink data to transmit will be is aware of or able to determine the priority of the groups receiving the data and therefore it may be advantageous if the user equipment transmits an indication of the priority towards the network node. The user equipment will also transmit a status report towards the network node providing the network node with information regarding the amount of uplink data to be transmitted and the identity of the group which it is to be transmitted to. In this way the network node is provided with sufficient information to allocate suitable resources for the uplink communication and to prioritise the allocation in a way that reflects the current priority of the groups.

In some embodiments, the method comprises prior to performing said generating step, determining a current priority of at least some of said plurality of groups of user equipment.

In order to signal the priority of the group to the network node, the user equipment needs to be aware of it. In some cases, it determines the priority itself, perhaps in response to information signalled to it by the operator or public safety controller using operator and management interface. Alternatively, the user equipment may determine the priorities from information associated with the uplink data.

In some embodiments, said step of transmitting said status report and said indication of said priority are a same transmitting step.

Although the priority can be transmitted in a number of ways, for example it may sent using RRC (radio resource control) signalling at the start of a communication and this may be appropriate where the information is semi-static, alternatively it may be sent using MAC (medium access control) signalling or it could be sent as signalling in the physical layer, alternatively it is transmitted with the status report, either as an additional signal or within the status report. Sending it with the status report may be advantageous as at this point the user equipment is requesting resource for the communication and thus, where the priority is changing dynamically, the network node will be confident when allocating resource that it has the current priority. Furthermore, using a single status report to transmit the amount of uplink data and, thus, the size of the resource required and also the priority is an efficient way of providing this information.

In some embodiments, the user equipment comprises pending uplink data to be transmitted to a plurality of said groups and said method comprises: determining a priority of said plurality of groups to which said pending uplink data is to be transmitted; and generating a status report for each of said pending uplink data; and transmitting said status reports in an order determined by said determined priority such that said status report related to uplink data to be transmitted to said highest priority group is transmitted first.

In some cases, there may be uplink data to be transmitted to a plurality of the groups. In some cases this may be the same uplink data to be transmitted to all the groups, or in other embodiments it may be different uplink data to be transmitted to different groups. In either case, the method determines a priority of each of the groups and then generates the status reports for each of the uplink data transmissions. The priority can be signalled by the order that the status reports are transmitted in, with the status report of the highest priority group being transmitted first. In this way, the network node is aware of the highest priority pending transmission and can allocate resource for that communication with a high priority. Furthermore, by transmitting the priority information using the order of requests, this information is transmitted in a convenient and yet efficient manner.

In some embodiments, the plurality of status reports are transmitted in a sequence that depends on the determined priority. In this respect, the status reports may be transmitted one immediately after the other if there is sufficient resource for this transmission.

In some embodiments, the method comprises, prior to transmitting at least one of said status reports within said sequence, transmitting a scheduling request and in response to receipt of a resource grant granting resource for transmitting said status report, transmitting as many of said status reports in said sequence as will fit within said resource grant.

In order to transmit the status reports to the network node, resource needs to be granted to the user equipment for this transmission. The user equipment will therefore transmit a scheduling request indicating that it requires resource for the transmission of the status report. In response to receipt of this grant, it will determine how much of the sequence it can transmit and will transmit as many of the status reports within the sequence as it can. Where there is not sufficient resource for all of the status reports to be transmitted then a subsequent scheduling request will be transmitted.

In other embodiments, the method comprises transmitting a scheduling request and receiving a resource grant prior to transmitting each of said status reports.

In some cases, the scheduling request may trigger the network node to generate enough resource for a single status report, in which case a scheduling request will be transmitted for each of the status reports and they will be transmitted in the order of priority of the group to which the communication is to be addressed.

In some embodiments, the method comprises transmitting said status report related to uplink data of said highest priority group and transmitting an indication that said user equipment comprises further uplink data awaiting transmission to said further lower priority groups.

In some cases, rather than transmitting new scheduling requests to indicate further pending uplink data, this indication may be transmitted either with or within the status report and the network node can respond to this by allocating more resources. This is an efficient way of transmitting the information. This information may be within the status report itself or it may be transmitted in the BSR MAC CE (Buffer Status Report, Medium Access Control, Control Element) within the band signalling.

In another embodiment, a reserved bit of the MAC PDU (Protocol Data Unit) header is used to convey this one bit information, whilst in another embodiment a new MAC CE format is defined to convey the information of the remaining buffer status reports for other groups.

In some embodiments, in response to pending uplink data to be transmitted to a plurality of groups, said method comprising generating said status report for said pending uplink data, said status report comprising a predetermined format comprising an indication of a priority of each of said plurality of groups for which there is pending uplink data and an indicator of a size of said corresponding uplink data.

Rather than transmitting individual status reports in a particular order to indicate the priorities, in some embodiments a status report with a particular format is used, which includes an indication of priority and an indication of size of the pending uplink data.

In some embodiments said status report comprises a group identifier for each of said plurality of groups, an order in which said group identifiers appear in said status report providing said indication of said priority of said group.

In other embodiments, the status report comprises priority indicators for each of said plurality of groups, a position within said status report being reserved for each of said plurality of groups such that each priority indication can be linked to a corresponding group from its location in the status report.

In some embodiments said predetermined format is such that a priority indicator for each of said plurality of groups for which there is pending uplink data are arranged adjacent to each other in a predetermined order, and an indicator of a size of said corresponding uplink data are arranged in a further portion of said status report.

In some cases, the group identifier is located adjacent to the group size and the order in which they are transmitted in the data stream indicates the order of priority. In other embodiments, the group identifiers are located adjacent to each other with the data sizes being located in a further portion of the status report. The latter may be a more compact and therefore efficient way of arranging the data and therefore may be advantageous.

It should be noted that in some embodiments the information comprising buffer sizes and group priority indicators are transmitted together as a sequence of information as MAC CE signalling in a predetermined format, so that in some cases the bit position within the transmitted data stream provides an indication of the group to which a priority pertains.

A second aspect of the present invention provides a user equipment comprising: a status report generator operable to generate a status report, said status report providing an indication of an amount of uplink data that is awaiting transmission as a direct transmission directly to user equipment within at least one of a plurality of groups of user equipment of which said user equipment is a member, and a group identifier identifying said at least one group to which said uplink data is to be transmitted; and a transmitter operable to transmit said status report and to transmit an indication of a priority of said at least one group towards said network node.

A third aspect of the present invention provides a method performed at a network node for allocating resources to a user equipment for transmitting uplink data, said uplink data being data that is to be transmitted as a direct communication directly between said user equipment and user equipment within at least one of a plurality of groups of user equipment of which said user equipment is a member, said method comprising: receiving from said user equipment at least one status report said at least one status report providing an indication of an amount of said uplink data pending at said user equipment and a group identifier identifying said at least one group to which said uplink data is to be transmitted; receiving from said user equipment an indication of a priority of said at least one group; and allocating resource for transmission of said uplink data to said user equipment in dependence upon said at least one status report.

When allocating resource to user equipment involved in direct communications, in order to do so efficiently a network node should be aware of the priority of the communications as they may be public safety communications, which may need to be transmitted with a high priority. Direct communications may be communications directly between two devices or it may be a communication from one device to multiple devices. In this regard the user equipment may be a member of one of several groups of user equipment and have communications to send to the different groups. In a public safety scenario for example, the different groups may be the different emergency services. Depending on the incident the priority of a group may change dynamically and, thus, it is advantageous if the user equipment can convey information regarding the priority of the resource as well as information which indicates the amount of resource required, as this will enable the network node to prioritise the communication appropriately.

In some embodiments, said indication of said priority is received with said at least one status report. Furthermore, where said uplink data is to be transmitted to a plurality of groups, the method in some embodiments comprises determining from said at least one status report an order of priority of said groups; and allocating resource for said uplink data to be transmitted to said highest priority group first and subsequently allocating resource for said uplink data to lower priority groups.

It may be advantageous for priority indication to be received with the status report as it is at this point that resource is allocated for the communication. Where a user equipment has several communications pending to different groups then the network node will allocate resources to the highest priority group first, allowing the highest priority communication to be transmitted.

In some embodiments, the method further comprises determining from said at least one status report uplink data to be transmitted to a highest priority group and that further uplink data to other groups is pending; allocating resource for said uplink data to be transmitted to said highest priority group and allocating a grant resource to said user equipment for transmission of a further status report.

In some cases, the status report not only indicates the nature of the uplink data to which it pertains, but also provides an indication if there is further uplink data pending. In this way, an additional scheduling request does not need to be transmitted for this further data and as well as allocating resource for the uplink data indicated by the status report the network node can also allocate a grant resource to the user equipment for transmission of one or more further status reports.

A fourth aspect of the present invention provides a network node comprising: a receiver operable to receive from said user equipment at least one status report, said at least one status report providing an indication of an amount of uplink data pending at said user equipment said uplink data being data that is to be transmitted as a direct communication directly between said user equipment and user equipment within at least one of a plurality of groups of user equipment of which said user equipment is a member and a group identifier identifying said at least one group to which said uplink data is to be transmitted, said receiver being further operable to receive an indication of a priority of said at least one group; and resource allocating logic operable to allocate resources to said user equipment for transmitting said uplink data in dependence upon said at least one status report.

A fifth aspect of the present invention provides a computer program which, when executed by a computer, is operable to control said computer to perform a method according to any one of a first aspect or a third aspect of the present invention.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which:

FIGS. 1a and 1b illustrate conventional buffer status reports;

FIG. 2 illustrates one example a new buffer status report format for direct communications according to an embodiment;

FIG. 3 illustrates a further example a new buffer status report format for direct communications according to a further embodiment.

DESCRIPTION OF THE EMBODIMENTS

Figure 4:
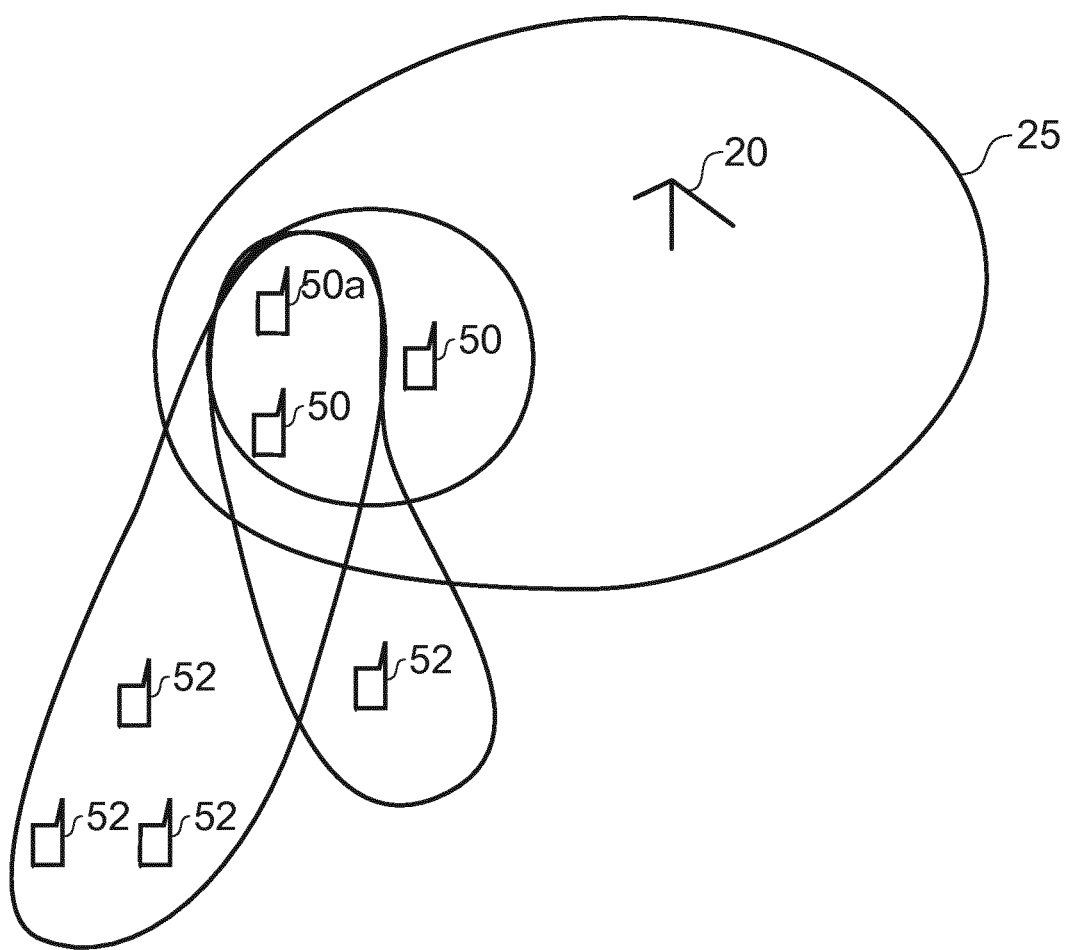
FIG. 4 illustrates a plurality of user equipment and a cell of a wireless communication network.

Before discussing the embodiments in any more detail, first an overview will be provided.

A method is disclosed which allows the user equipment to inform the network of a dynamically changing group priority. The priority information is provided to the network early in the communication process and in some cases the BSR (buffer status report) transmission is enhanced to communicate the group priority information to the network.

In effect the UE is enabled to inform the network node of the different priorities of the groups as decided by the UE in some cases this information is transmitted together with BSR (buffer status report) transmission, which indicates the amount of uplink data awaiting transmission and the identity of the group it is directed to.

There are several ways of doing this two of them involve the re-use of legacy BSR formats.

In one embodiment the priority is indicated by the order that the BSRs are transmitted in, with the BSR corresponding to the communication to the highest priority group being transmitted first followed by the second highest and third highest and so on.

Only one BSR is transmitted at a time and the network is informed of the remaining BSRs to be transmitted. FIG. 1 shows the legacy BSR formats.

In another embodiment the legacy short BSRs per group are signalled in their priority order in one MAC PDU.

Alternatively, a new design of BSR format for direct or ProSe communications is provided in which the new BSR format signals the group BSR priorities.

The current LTE standard defines two BSR formats named short BSR (or truncated BSR) and long BSR. In order to reduce the amount of signalling, the logical channels are grouped into 4 groups and the Buffer status are transmitted per logical channel group (LCG). With the short BSR format buffer status this information is signalled for one LCG. While with long BSR format, the buffer status is reported for all four LCGs. The formats are shown in FIG. 1. The transmission of BSR MAC CE is identified by the associated logical channel ID for truncated, short or long BSR included in the MAC PDU sub-header.

When requesting resource for uplink allocation, the earliest communication from the UE to the network upon the arrival of new data is the scheduling request (SR) in the case that there is no UL grant to deliver the BSR. The priority group information could in some embodiments be communicated to the network via the SR transmission. However, this requires multiple dedicated scheduling request D-SR configurations (for each group) and for each UE. Having multiple D-SR allocation is not seen as favourable considering that dedicated resource needs to be reserved, making it resource inefficient.

A subsequent possibility of informing the network of group priority is with the BSR. The legacy BSR format uses four LCGs where the network configures which logical channels are grouped in to one LCG. LCG is used by the network in scheduling group of UEs in the system. If radio resources are limited, the UEs with data on the highest priority LCG is provided with grant.

A similar concept can be used for ProSe BSR, where the network configures the member groups into group of group (GG) for ProSe. If the data arrives on any of the GGs, BSR is triggered. Unlike the legacy BSR procedure, where the signalled LCG can be used to prioritize scheduling between group of UEs, ProSe involves the prioritizing between the UEs and also the prioritizing between the public safety groups. Legacy BSR format has two format short and long BSR format. Even though the short BSR indicates the LCGID, long BSR has fixed order of appearance of LCGIDs. Therefore, the long BSR as per legacy cannot be used to inform the group priority to the network. The following solutions are proposed.

Solution 1:

Upon data arrival, only the highest priority group BSR is signalled to the network and this may be in the form of the legacy short BSR as shown in FIG. 1a. The highest priority group is decided by the UE at the time of BSR transmission. Second highest and third highest so on group BSR transmitted as the UL grant is available.

In order to receive further grants for the transmission of remaining BSRs, the UE indicates a one bit flag in the transmitted BSR MAC CE (in band signalling). In one embodiment, a reserved bit of the MAC PDU header is used to convey this 1 bit information. In another embodiment, a new MAC CE format is defined to convey the information of the remaining group BSRs. In this way in response to receiving the BSR communication the network node can allocate resource for this communication and it is also aware that further BSRs are awaiting transmission and can allocate resource for these too.

Solution 2:

Upon data arrival, only the highest priority group BSR is signalled to the network. The highest priority group is decided by the UE at the time of BSR transmission. Second highest and third highest and so on BSRs are transmitted as the UL grant is available. In order to receive further grants for the transmission of remaining BSRs, the UE trigger SRs after transmission of individual BSRs.

Solution 3:

Upon data arrival, individual BSR per each group of groups GG is transmitted in sequence of their priority order decided by the UE. If there is a big enough grant to accommodate all the triggered BSRs, the UE indicate all the BSRs in priority order in one MAC PDU.

In one embodiment, multiple short BSRs are transmitted in sequence.

In another embodiment, a new BSR format is designed as shown in FIG. 2. The order of appearance of the groups in the group of groups indicates their priority order as decided by the UE. The MAC CE can either be designed to be variable length or fixed length.

Solution 4:

New BSR MAC CE is designed to inform the network of the group priorities. An example is shown in FIG. 3. A bit map of two bits is allocated at the beginning of the MAC CE to indicate the relative priority of each GG. The bit map position for each GG is configured by the network, and this may be based on the network allocated GG priorities. The priorities decided by the UE are indicated using two bits with 11 representing the highest priority and 10 the second highest priority 01 the third highest priority and 00 represents the lowest priority.

In one embodiment, the buffer size of each GG is provided in the order as defined by the network (eg: same as the order of the bit map position).

In another embodiment, buffer size of each GG is provided in the order of UE decided priorities.

It should be noted that the formats shown in FIGS. 2 to 3 are example formats and are not limiting, it would be clear to a skilled person that a number of different formats would be appropriate.

FIG. 4 shows schematically a network node 20 supporting a radio cell 25 in which there are multiple user equipment 50. There are also user equipment 52 outside the coverage of the cell. The user equipment 50 are configured to perform cellular communications and direct communications with each other. In this embodiment, they are allocated to particular groups and can communicate with each other within these groups. In this regard, a communication within a group may have a particular priority depending on the circumstances and this priority may change. For the user equipment that are within radio cell 25, when they wish to perform direct communication, then they may do so using resources allocated under the control of network node 20.

In this regard, in order to be able to communicate with each other, they need to be allocated a resource on which to transmit a signal. Generally, direct communications between user equipment are performed on half duplex channels such that data is transmitted in one direction only. In order to avoid collision between user equipment, it is advantageous if the resource is allocated to a user equipment that wishes to form a direct communication and where this is under control of a network node, it can ensure that it does not allocate the same resource to other user equipment. Where the user equipment are out of network coverage, then they will need to allocate the resources in a different way. Generally, this is done from a pool of resources and the risk of collision is higher.

When a user equipment 50a within cell 25 has data in its uplink buffer for transmission to a group of user equipment of which it is a member, then in order to be able to do this, it transmits a scheduling request to network node 20 indicating that it requires resource for this communication.

In response to receipt of such a scheduling request, the network node will generate a scheduling grant which will allocate resources for transmission of a buffer status report indicating the amount of uplink data within the transmission buffer for a particular pending communication. At this point the network node may be unaware of the nature of the communication that the scheduling request is for, i.e. whether it is a cellular or direct communication and in this case it will treat all requests with a high priority and grant resource for transmission of the buffer status report.

In response to receipt of the resource grant the user equipment will transmit the buffer status report which indicates the quantity of uplink data. The buffer status report may also indicate that the communication is a direct communication and provide an identifier identifying a group to which the communication is to be sent and an indication of the current priority of that group. This information may be provided either in the order that multiple BSRs are transmitted or by transmitting a single BSR with a format such as is shown in FIG. 2 or 3. These formats provide a single BSR for several communications of uplink data that are awaiting transmission to different groups. In some embodiments the order that the group IDs identifying the groups appear in within the BSR provides an indication of the current group priority, while in others there is an indication of priority provided in a predetermined position dedicated to that group's priority within the BSR.

In FIG. 3 the Priorities appear in a predetermined order which links them to their group at the start of the buffer status report and the data quantities appear later also in a predetermined order, this may be space efficient way of transmitting the information.

Once the network node 20 has received the buffer status report it will allocate suitable resources for the communications.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method, performed at a user equipment, of requesting resource from a network node supporting a cell within a wireless network for transmitting data, said data being data that is to be transmitted as a direct communication directly between said user equipment and user equipment within at least one of a plurality of groups of user equipment of which said user equipment is a member, said method comprising:

generating a status report, said status report providing an indication of an amount of said data and an indication of at least two groups to which said data is to be transmitted;
transmitting an indication of a priority of said at least two groups towards said network node; and
transmitting said status report towards said network node;
wherein said transmitting said status report and said indication of said priority are a same transmission;
wherein in response to pending data to be transmitted to a plurality of groups, said method comprises generating said status report for said pending data, said status report comprising a predetermined format comprising an indication of a priority of each of said plurality of groups for which there is pending data and an indicator of a size of said corresponding data;
wherein said status report comprises a group identifier for each of said plurality of groups, an order in which said group identifiers appear in said status report providing said indication of said priority of said group;
wherein the highest priority group identifier is transmitted first;
wherein the method further comprises transmitting a scheduling request prior to transmitting said status report;
wherein the user equipment comprises the pending data to be transmitted to the plurality of the groups and said method comprises:
  determining the priority of the plurality of the groups to which said pending data is to be transmitted;
  generating a status report for each of said pending data; and
  transmitting said status reports in an order determined by said determined priority such that said status report related to data to be transmitted to said highest priority group is transmitted first; and
wherein the method further comprises prior to transmitting said status reports, transmitting a scheduling request and, in response to receipt of a resource grant granting resource for transmitting said status report, transmitting as many of said status reports in said sequence as will fit within said resource grant.

2. The method according to claim 1, comprising prior to performing said generating, determining a current priority of at least some of said plurality of groups of user equipment including determining the priority of said at least two groups.

3. The method according to claim 1, comprising transmitting said status report related to data of said highest priority group and transmitting an indication that said user equipment comprises further data awaiting transmission to said further lower priority groups.

4. The method according to claim 1, wherein said predetermined format is such that a priority indicator for each of said plurality of groups for which there is pending data are arranged adjacent to each other in a predetermined order, and an indicator of a size of said corresponding data are arranged in a further portion of said status report.

5. A user equipment comprising:
a status report generator operable to generate a status report, said status report providing an indication of an amount of data that is awaiting transmission as a direct transmission directly to user equipment within at least one of a plurality of groups of user equipment of which said user equipment is a member, and an indication of at least two groups to which said data is to be transmitted; and
a transmitter operable to, in a same transmission, transmit said status report and transmit an indication of a priority of said at least two groups towards a network node configured to support a cell;
wherein the status report generator is further operable to, in response to pending data to be transmitted to a plurality of groups, generate said status report for said pending data, said status report comprising a predetermined format comprising an indication of a priority of each of said plurality of groups for which there is pending data and an indicator of a size of said corresponding data;
wherein said status report comprises a group identifier for each of said plurality of groups, an order in which said group identifiers appear in said status report providing said indication of said priority of said group;
wherein the transmitter is further operable to transmit the highest priority group identifier first, and operable to transmit a scheduling request prior to transmitting said status report;
wherein the user equipment comprises the pending data to be transmitted to the plurality of the groups;
wherein the user equipment is operable to determine the priority of the plurality of the groups to which said pending data is to be transmitted;
wherein the status report generator is further operable to generate a status report for each of said pending data; and
wherein the transmitter is further operable to:
  transmit said status reports in an order determined by said determined priority such that said status report related to data to be transmitted to said highest priority group is transmitted first; and
  prior to transmitting said status reports, transmit a scheduling request and, in response to receipt of a resource grant granting resource for transmitting said status report, transmit as many of said status reports in said sequence as will fit within said resource grant.

6. A method, performed at a network node supporting a cell, for allocating resources to a user equipment for transmitting data, said data being data that is to be transmitted as a direct communication directly between said user equipment and user equipment within at least one of a plurality of groups of user equipment of which said user equipment is a member, said method comprising:
receiving from said user equipment at least one status report, said at least one status report providing an indication of an amount of said data pending at said user equipment and an indication of at least two groups to which said data is to be transmitted;
receiving from said user equipment an indication of a priority of said at least two groups; and
allocating resource for transmission of said data to said user equipment in dependence upon said at least one status report;
wherein said status report and said indication of said priority are received in a same transmission;
wherein in response to pending data to be transmitted to a plurality of groups, said method comprising receiving said status report for said pending data, said status report comprising a predetermined format comprising an indication of a priority of each of said plurality of groups for which there is pending data and an indicator of a size of said corresponding data;
wherein said status report comprises a group identifier for each of said plurality of groups, an order in which said group identifiers appear in said status report providing said indication of said priority of said group;
wherein the highest priority group identifier is received first; and
wherein the method further comprises:
receiving a scheduling request prior to receiving said status report;
receiving status reports for each of the pending data, the status received in an order determined by the user equipment such that said status report related to data to be transmitted to said highest priority group is received first; and
prior to receiving said status reports, receiving a scheduling request and, in response to transmit of a resource grant granting resource for transmitting said status report, receiving as many of said status reports in said sequence as will fit within said resource grant.

7. A network node configured to support a cell, the network node comprising:
a receiver operable to receive from a user equipment at least one status report, said at least one status report providing an indication of an amount of data pending at said user equipment said data being data that is to be transmitted as a direct communication directly between said user equipment and user equipment within at least one of a plurality of groups of user equipment of which said user equipment is a member and an indication of at least two groups to which said data is to be transmitted, said receiver being further operable to receive an indication of a priority of said at least two groups in a same transmission as the status report; and
resource allocating logic operable to allocate resources to said user equipment for transmitting said data in dependence upon said at least one status report;
wherein the receiver is further operable to, in response to pending data to be transmitted to a plurality of groups, receive said status report for said pending data, said status report comprising a predetermined format comprising an indication of a priority of each of said plurality of groups for which there is pending data and an indicator of a size of said corresponding data;
wherein said status report comprises a group identifier for each of said plurality of groups, an order in which said group identifiers appear in said status report providing said indication of said priority of said group; and
wherein the receiver is further operable to receive the highest priority group identifier first, and operable to receive a scheduling request prior to receiving said status report;
wherein the receiver is further operable to receive status reports for each of the pending data, the status received in an order determined by the user equipment such that said status report related to data to be transmitted to said highest priority group is received first; and
wherein the receiver is further operable to, prior to receiving said status reports, receive a scheduling request and, in response to transmit of a resource grant granting resource for transmitting said status report, receive as many of said status reports in said sequence as will fit within said resource grant.

8. A computer program which when executed by a computer is operable to control said computer to perform the method according to claim 1.

9. A computer program which when executed by a computer is operable to control said computer to perform the method according to claim 6.

10. A method, performed at a user equipment, of requesting resource from a network node supporting a cell within a wireless network for transmitting data, said data being data that is to be transmitted as a direct communication directly between said user equipment and user equipment within at least one of a plurality of groups of user equipment of which said user equipment is a member, said method comprising:
generating a status report, said status report providing an indication of an amount of said data and an indication of at least two groups to which said data is to be transmitted;
transmitting an indication of a priority of said at least two groups towards said network node; and
transmitting said status report towards said network node;
wherein said transmitting said status report and said indication of said priority are a same transmission;
wherein in response to pending data to be transmitted to a plurality of groups, said method comprises generating said status report for said pending data, said status report comprising a predetermined format comprising an indication of a priority of each of said plurality of groups for which there is pending data and an indicator of a size of said corresponding data;
wherein said status report comprises a group identifier for each of said plurality of groups, an order in which said group identifiers appear in said status report providing said indication of said priority of said group;
wherein the highest priority group identifier is transmitted first;
wherein the method further comprises transmitting a scheduling request prior to transmitting said status report;
wherein the user equipment comprises the pending data to be transmitted to the plurality of the groups and said method comprises:
determining the priority of the plurality of the groups to which said pending data is to be transmitted;
generating a status report for each of said pending data; and
transmitting said status reports in an order determined by said determined priority such that said status report related to data to be transmitted to said highest priority group is transmitted first; and
wherein the method further comprises receiving a resource grant prior to transmitting each of said status reports.

11. A user equipment comprising:
a status report generator operable to generate a status report, said status report providing an indication of an amount of data that is awaiting transmission as a direct transmission directly to user equipment within at least one of a plurality of groups of user equipment of which said user equipment is a member, and an indication of at least two groups to which said data is to be transmitted; and
a transmitter operable to, in a same transmission, transmit said status report and transmit an indication of a priority of said at least two groups towards a network node configured to support a cell;
wherein the status report generator is further operable to, in response to pending data to be transmitted to a plurality of groups, generate said status report for said pending data, said status report comprising a predetermined format comprising an indication of a priority of each of said plurality of groups for which there is pending data and an indicator of a size of said corresponding data;

wherein said status report comprises a group identifier for each of said plurality of groups, an order in which said group identifiers appear in said status report providing said indication of said priority of said group;

wherein the transmitter is further operable to transmit the highest priority group identifier first, and operable to transmit a scheduling request prior to transmitting said status report;

wherein the user equipment comprises the pending data to be transmitted to the plurality of the groups;

wherein the user equipment is operable to determine the priority of the plurality of the groups to which said pending data is to be transmitted;

wherein the status report generator is further operable to generate a status report for each of said pending data;

wherein the transmitter is further operable to transmit said status reports in an order determined by said determined priority such that said status report related to data to be transmitted to said highest priority group is transmitted first; and wherein the user equipment is operable to receive a resource grant prior to transmitting each of said status reports.

12. A method, performed at a network node supporting a cell, for allocating resources to a user equipment for transmitting data, said data being data that is to be transmitted as a direct communication directly between said user equipment and user equipment within at least one of a plurality of groups of user equipment of which said user equipment is a member, said method comprising:

receiving from said user equipment at least one status report, said at least one status report providing an indication of an amount of said data pending at said user equipment and an indication of at least two groups to which said data is to be transmitted;

receiving from said user equipment an indication of a priority of said at least two groups; and allocating resource for transmission of said data to said user equipment in dependence upon said at least one status report;

wherein said status report and said indication of said priority are received in a same transmission;

wherein in response to pending data to be transmitted to a plurality of groups, said method comprising receiving said status report for said pending data, said status report comprising a predetermined format comprising an indication of a priority of each of said plurality of groups for which there is pending data and an indicator of a size of said corresponding data;

wherein said status report comprises a group identifier for each of said plurality of groups, an order in which said group identifiers appear in said status report providing said indication of said priority of said group;

wherein the highest priority group identifier is received first; and wherein the method further comprises receiving:
a scheduling request prior to receiving said status report; and
status reports for each of the pending data, the status received in an order determined by the user equipment such that said status report related to data to be transmitted to said highest priority group is received first; and wherein the method further comprises transmitting a resource grant prior to receiving each of said status reports.

13. A network node configured to support a cell, the network node comprising:

a receiver operable to receive from a user equipment at least one status report, said at least one status report providing an indication of an amount of data pending at said user equipment said data being data that is to be transmitted as a direct communication directly between said user equipment and user equipment within at least one of a plurality of groups of user equipment of which said user equipment is a member and an indication of at least two groups to which said data is to be transmitted, said receiver being further operable to receive an indication of a priority of said at least two groups in a same transmission as the status report; and resource allocating logic operable to allocate resources to said user equipment for transmitting said data in dependence upon said at least one status report;

wherein the receiver is further operable to, in response to pending data to be transmitted to a plurality of groups, receive said status report for said pending data, said status report comprising a predetermined format comprising an indication of a priority of each of said plurality of groups for which there is pending data and an indicator of a size of said corresponding data;

wherein said status report comprises a group identifier for each of said plurality of groups, an order in which said group identifiers appear in said status report providing said indication of said priority of said group; and wherein the receiver is further operable to receive the highest priority group identifier first, and operable to receive a scheduling request prior to receiving said status report;

wherein the receiver is further operable to receive status reports for each of the pending data, the status received in an order determined by the user equipment such that said status report related to data to be transmitted to said highest priority group is received first; and wherein the network node is operable to transmit a resource grant prior to receiving each of said status reports.

* * * * *